US008962167B2

(12) United States Patent
Kim et al.

(10) Patent No.: US 8,962,167 B2
(45) Date of Patent: Feb. 24, 2015

(54) SECONDARY BATTERY HAVING AN INSULATOR WITH PROTRUSIONS

(75) Inventors: Yong-Sam Kim, Gyeonggi-do (KR);
Sang-Won Byun, Gyeonggi-do (KR);
Ji-Hyoung Yoon, Gyeonggi-do (KR);
Masanori Kogure, Gyeonggi-do (KR);
Zin Park, Gyeonggi-do (KR)

(73) Assignee: Samsung SDI Co., Ltd., Yongin-si (KR)

(*) Notice: Subject to any disclaimer, the term of this patent is extended or adjusted under 35 U.S.C. 154(b) by 1347 days.

(21) Appl. No.: 12/199,744

(22) Filed: Aug. 27, 2008

(65) Prior Publication Data
US 2009/0061310 A1 Mar. 5, 2009

(30) Foreign Application Priority Data

Aug. 27, 2007 (KR) .................. 10-2007-0086143

(51) Int. Cl.
*H01M 2/12* (2006.01)
*H01M 2/04* (2006.01)
*H01M 2/34* (2006.01)
*H01M 10/052* (2010.01)

(52) U.S. Cl.
CPC .......... *H01M 2/1241* (2013.01); *H01M 2/0413* (2013.01); *H01M 2/046* (2013.01); *H01M 2/345* (2013.01); *H01M 10/052* (2013.01)
USPC ................. 429/53; 429/56; 429/175; 429/185

(58) Field of Classification Search
USPC ...................... 429/185, 53–56, 175
See application file for complete search history.

(56) References Cited

U.S. PATENT DOCUMENTS

| 3,939,011 | A  | * | 2/1976 | Zaleski ..................... 429/54 |
| 5,418,082 | A  | * | 5/1995 | Taki et al. ................. 429/53 |
| 5,707,756 | A  |   | 1/1998 | Inoue |
| 5,879,832 | A  | * | 3/1999 | Vu et al. .................... 429/62 |
| 6,207,320 | B1 | * | 3/2001 | Song et al. ................ 429/171 |
| 6,346,344 | B1 | * | 2/2002 | Song et al. ................ 429/61 |
| 6,537,693 | B1 |   | 3/2003 | Suzuki et al. |
| 6,649,301 | B1 | * | 11/2003 | Oh et al. .................... 429/56 |
| 7,981,541 | B2 |   | 7/2011 | Sato et al. |

(Continued)

FOREIGN PATENT DOCUMENTS

| CN | 1784798 | 6/2006 |
| JP | 06-140011 | 5/1994 |

(Continued)

OTHER PUBLICATIONS

EP Search Report for related EP Application No. 09177456.2-2119, Feb. 2, 2010.

(Continued)

*Primary Examiner* — Gregg Cantelmo
(74) *Attorney, Agent, or Firm* — Knobbe Martens Olson & Bear LLP

(57) ABSTRACT

There is a provided a secondary battery capable of preventing unloading and rotating caused by possible vibration or shock by increasing a coupling force among the vent plate, the insulator, and the cap-down that compose the cap assembly of the secondary battery. To increase the coupling force among the vent plate, the insulator, and the cap-down, protrusions and corresponding grooves or holes, and grooves with step areas may be formed. Alternatively, a plurality of insulators may be formed in a divided form. A secondary battery with a reliable cap assembly can be implemented through such a structural change.

9 Claims, 15 Drawing Sheets

(56) References Cited

U.S. PATENT DOCUMENTS

| | | |
|---|---|---|
| 2003/0013005 A1 | 1/2003 | Chang |
| 2003/0027038 A1 | 2/2003 | Tsukamoto et al. |
| 2005/0074667 A1 | 4/2005 | Yang |
| 2005/0084752 A1* | 4/2005 | Kim .............................. 429/185 |
| 2006/0078787 A1 | 4/2006 | Sato |
| 2006/0093904 A1 | 5/2006 | Cheon et al. |
| 2006/0115725 A1* | 6/2006 | Kim .............................. 429/174 |
| 2007/0134547 A1 | 6/2007 | Bouffard |
| 2007/0212595 A1 | 9/2007 | Kim et al. |
| 2008/0131769 A1* | 6/2008 | Sato et al. .................... 429/174 |
| 2008/0182159 A1 | 7/2008 | Mitani et al. |
| 2009/0186269 A1 | 7/2009 | Kim et al. |
| 2010/0136388 A1 | 6/2010 | Kim et al. |

FOREIGN PATENT DOCUMENTS

| | | |
|---|---|---|
| JP | 06-215746 | 8/1994 |
| JP | 06-215747 | 8/1994 |
| JP | 07-027051 | 5/1995 |
| JP | 07-254401 | 10/1995 |
| JP | 08-153536 | 6/1996 |
| JP | 95-027051 | 8/1996 |
| JP | 08-293295 | 11/1996 |
| JP | 10 340714 | 12/1998 |
| JP | 2000-090912 | 3/2000 |
| JP | 2001-196047 | 7/2001 |
| JP | 2001-351608 | 12/2001 |
| JP | 2002-170531 | 6/2002 |
| JP | 2003-187773 | 7/2003 |
| JP | 2003-217544 | 7/2003 |
| JP | 2004-152697 | 5/2004 |
| JP | 2004-319465 | 11/2004 |
| JP | 2005-174903 | 6/2005 |
| JP | 2006-066269 | 3/2006 |
| JP | 2006-286561 | 10/2006 |
| JP | 2007-207453 | 8/2007 |
| JP | 2008-130482 | 6/2008 |
| KR | 97-47070 | 7/1997 |
| KR | 1020010056363 | 12/1999 |
| KR | 1020010051870 | 6/2001 |
| KR | 1020010061303 | 7/2001 |
| KR | 1020010101035 | 11/2001 |
| KR | 1020030066243 | 8/2003 |
| KR | 100471966 | 2/2005 |
| KR | 1020070076172 | 1/2006 |
| KR | 102006 002236 | 3/2006 |
| KR | 100579400 | 5/2006 |
| KR | 1020060037595 | 5/2006 |
| KR | 1020060112728 A | 11/2006 |
| KR | 1020060118719 A | 11/2006 |
| KR | 10-0734758 | 6/2007 |
| KR | 1020070093171 | 9/2007 |
| KR | 1020080007155 | 1/2008 |
| KR | 1020080022945 | 3/2008 |
| KR | 1020080043533 | 5/2008 |
| KR | 1020080082266 | 9/2008 |
| KR | 1020080099449 | 11/2008 |

OTHER PUBLICATIONS

Office Action dated Jan. 30, 2012 for corresponding CN Application No. 200910246085.0.

Office Action dated Nov. 14, 2011 for related U.S. Appl. No. 12/486,315.

Notice of Allowability for priority Korean Application No. 10-2007-0086143.

Notice of Allowance issued Nov. 25, 2010 for KR Patent Application No. 10-2009-0059902 which corresponds to related U.S. Appl. No. 12/486,315.

Office Action dated Apr. 27, 2012 for corresponding U.S. Appl. No. 12/486,315.

Notice of Allowability dated Jan. 22, 2013 for corresponding JP Application No. 2009-273374.

Office Action dated Oct. 10, 2012 for corresponding CN Application No. 200910246085.0.

* cited by examiner

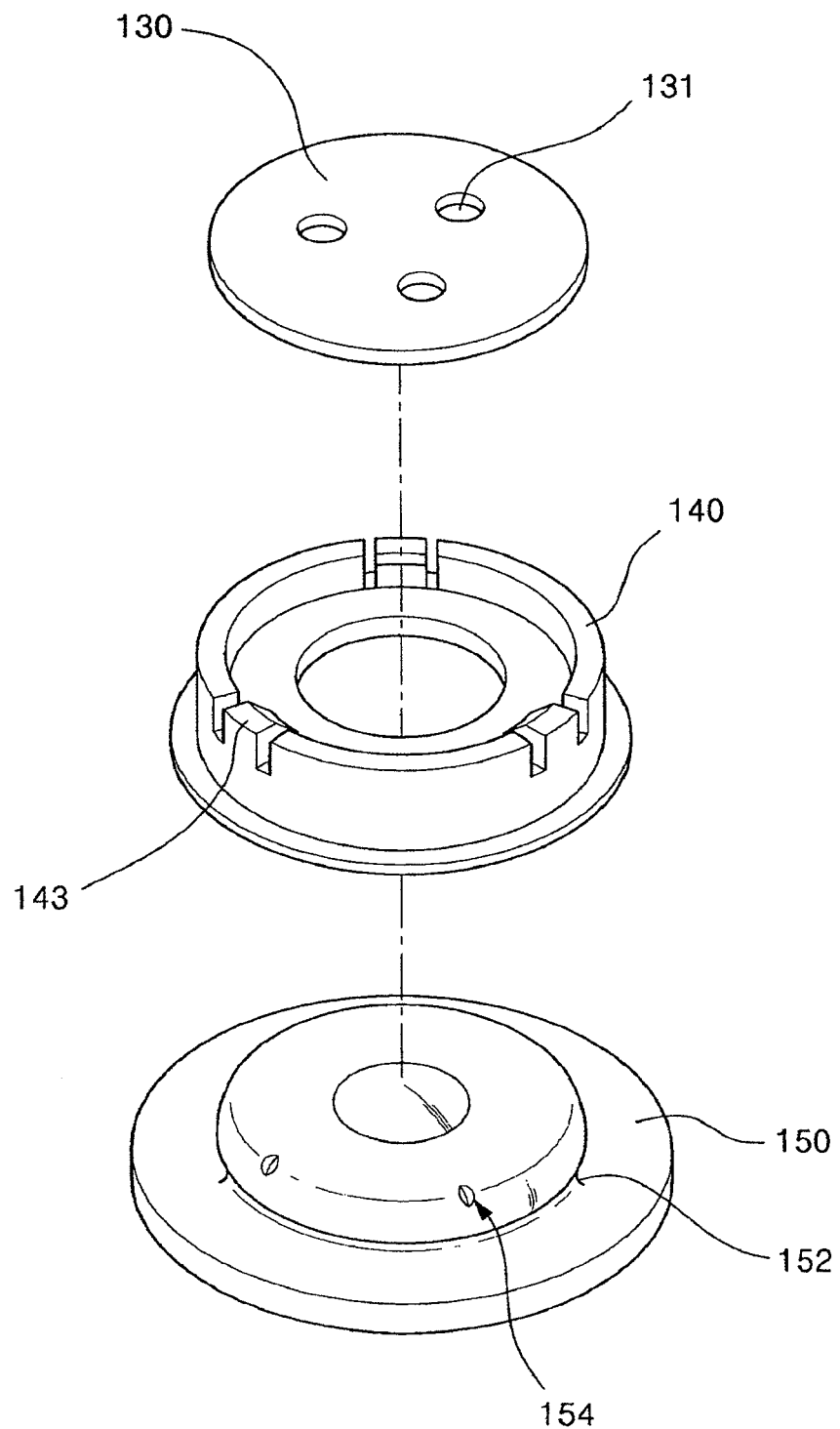

SECONDARY BATTERY HAVING AN INSULATOR WITH PROTRUSIONS

CROSS-REFERENCE TO RELATED APPLICATION

This application claims the benefit of Korean Patent Application No. 2007-86143 filed Aug. 27, 2007, the disclosure of which is hereby incorporated herein by reference in its entirety.

BACKGROUND OF THE INVENTION

1. Technical Field

The present invention relates to a secondary battery, and more particularly, to a secondary battery having high durability against vibration and shock and has improved coupling of a cap assembly.

2. Discussion of Related Art

Typical batteries are classified into primary batteries and secondary batteries. The primary batteries are often disposable because they either cannot be charged or can only be charged very slowly. On the other hand, the secondary batteries exhibit reversible conversion between chemical energy and electrical energy, thus allowing for repetitive charging and discharging.

Secondary batteries may be classified into nickel batteries and lithium batteries depending on the active material of their electrode. In particular, an amount of energy that can be charged depends on materials of the electrodes and electrolyte. The lithium secondary batteries are capable of storing the most energy in the same volume and are widely used as power supplies for modern cell phones, notebook computers, camcorders, personal digital assistants (PDAs), etc.

The lithium secondary batteries use lithium oxide as a cathode active material and carbon oxide as an anode active material. The lithium secondary batteries may be classified into lithium ion batteries using liquid electrolyte and lithium polymer batteries using polymer electrolyte depending on electrolyte types. The lithium secondary batteries may be of several types, including a cylindrical type, a polygonal type, a pouch type, and the like.

Such a secondary battery generally comprises an electrode assembly having a cathode plate and an anode plate wound with a separator interposed therebetween, a case for accommodating the electrode assembly, and a cap assembly located on an opening of the case for sealing the case, with a gasket interposed between the cap assembly and the case.

Specifically, the cap assembly often comprises a top cap member or cap-up, a vent plate, an insulator, and a bottom cap member or cap-down.

The insulator is often vertically fastened with the vent plate. In this case, first fastening members of the insulator are coupled with insertion portions of the vent plate, causing the first fastening members to interfere with bent portions of the vent plate.

Since the interference with the bent portions increases with an increasing size of the first fastening member, the first fastening member is not allowed to increase above a predetermined size.

As a result, a coupling force between the first fastening members and the insertion portions to couple the insulator with the vent plate is limited and the insulator is more likely to rotate and be unloaded or otherwise dislodged due to possible vibration or shock.

The insulator and the cap-down are also coupled to each other by second fastening members of the insulator. In this case, the second fastening members vertically presses the cap-down to be fixed thereto. This may cause the cap-down to rotate due to possible vibration or shock.

The rotation of the cap-down may break a weld between the vent and the cap-down. Thus, a current path from the electrode assembly to the cap-up can be abnormally blocked impeding the normal operation of the battery.

SUMMARY OF THE INVENTION

An aspect of the present invention provides a secondary battery having an increased coupling force among a vent plate, an insulator and a cap-down.

Exemplary embodiments of the present invention provide a secondary battery comprising: an electrode assembly formed with a separator interposed between a cathode plate and an anode plate; a case for accommodating the electrode assembly; and a cap assembly for sealing the case, wherein the cap assembly comprises a vent plate, an insulator including a plurality of protrusions, and a cap-down including a plurality of grooves or holes located corresponding to the protrusions.

Other embodiments of the present invention provide a secondary battery comprising: an electrode assembly formed with a separator interposed between a cathode plate and an anode plate; a case for accommodating the electrode assembly; and a cap assembly for sealing the case, wherein the cap assembly comprises a vent plate including a plurality of step areas, an insulator, and a cap-down.

Other embodiments of the present invention provide a secondary battery comprising: an electrode assembly formed with a separator interposed between a cathode plate and an anode plate; a case for accommodating the electrode assembly; and a cap assembly for sealing the case, wherein the cap assembly comprises a vent plate including a plurality of protrusions, an insulator including a plurality of grooves or holes located corresponding to the protrusions, and a cap-down.

Other embodiments of the present invention provide a secondary battery comprising: an electrode assembly formed with a separator interposed between a cathode plate and an anode plate; a case for accommodating the electrode assembly; and a cap assembly for sealing the case, wherein the cap assembly comprises a vent plate, an insulator, and a cap-down including a plurality of step areas.

Other embodiments of the present invention provide a secondary battery comprising: an electrode assembly formed with a separator interposed between a cathode plate and an anode plate; a case for accommodating the electrode assembly; and a cap assembly for sealing the case, wherein the cap assembly comprises a vent plate, a plurality of insulators each including a plurality of protrusions, and a cap-down including a plurality of grooves or holes located corresponding to the protrusions.

Thus, in the secondary battery of the present invention, the cap-down, the insulator and the vent plate are prevented from rotating and being unloaded due to possible vibration or shock, thereby improving coupling force and durability of the cap assembly.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 2A is an assembly view illustrating a cap assembly of the secondary battery according to a second embodiment of the present invention;

DETAILED DESCRIPTION OF THE INVENTION

Figure 1A:
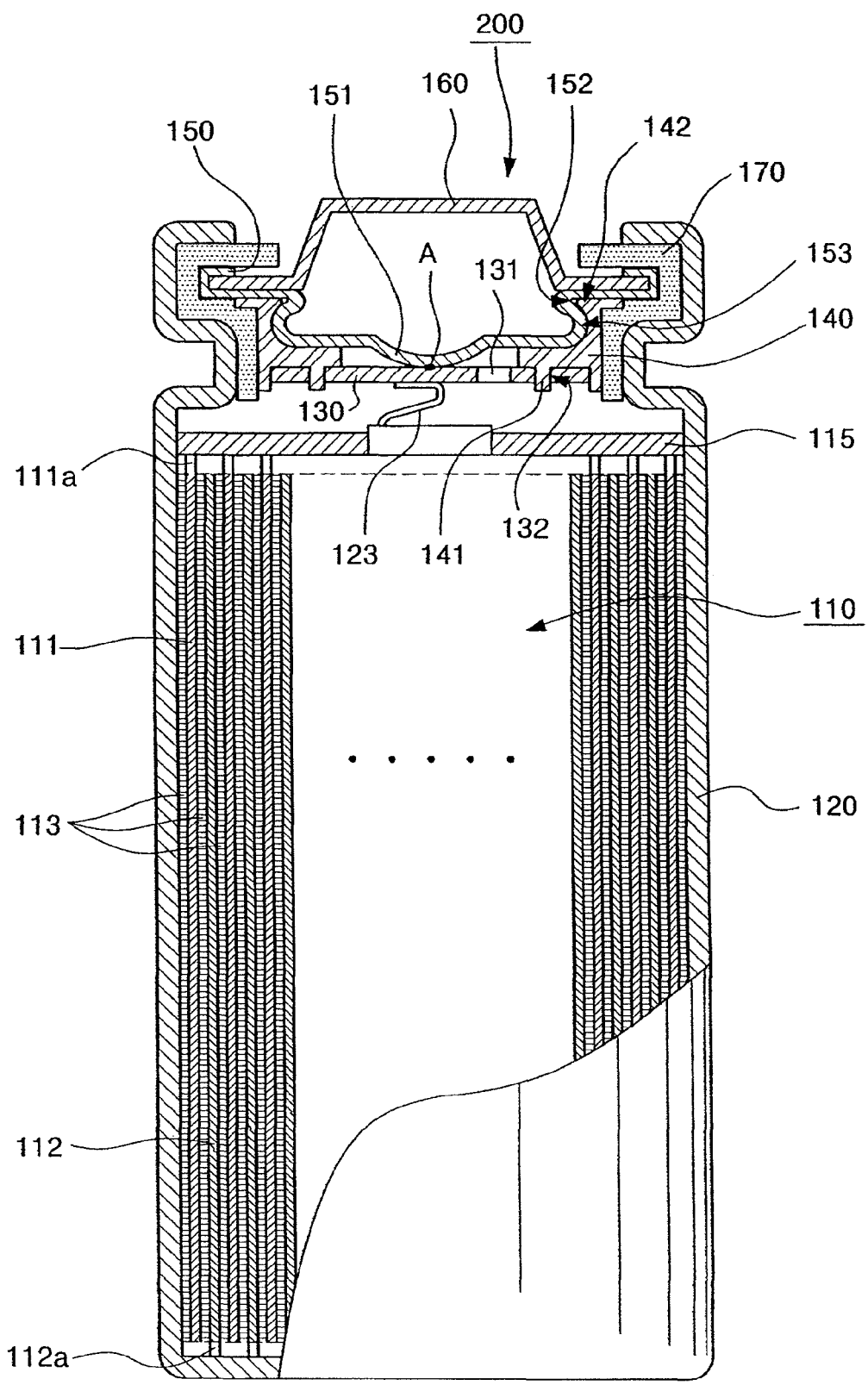
FIG. 1A is a cross-sectional view illustrating a secondary battery according to a first embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention. In the drawings, a length, a thickness and the like of layers and areas may be exaggerated for the convenience of explanation. Like numbers refer to like elements.

The First Embodiment

FIG. 1A is a cross-sectional view illustrating a secondary battery according to a first embodiment of the present invention.

Figure 1B:
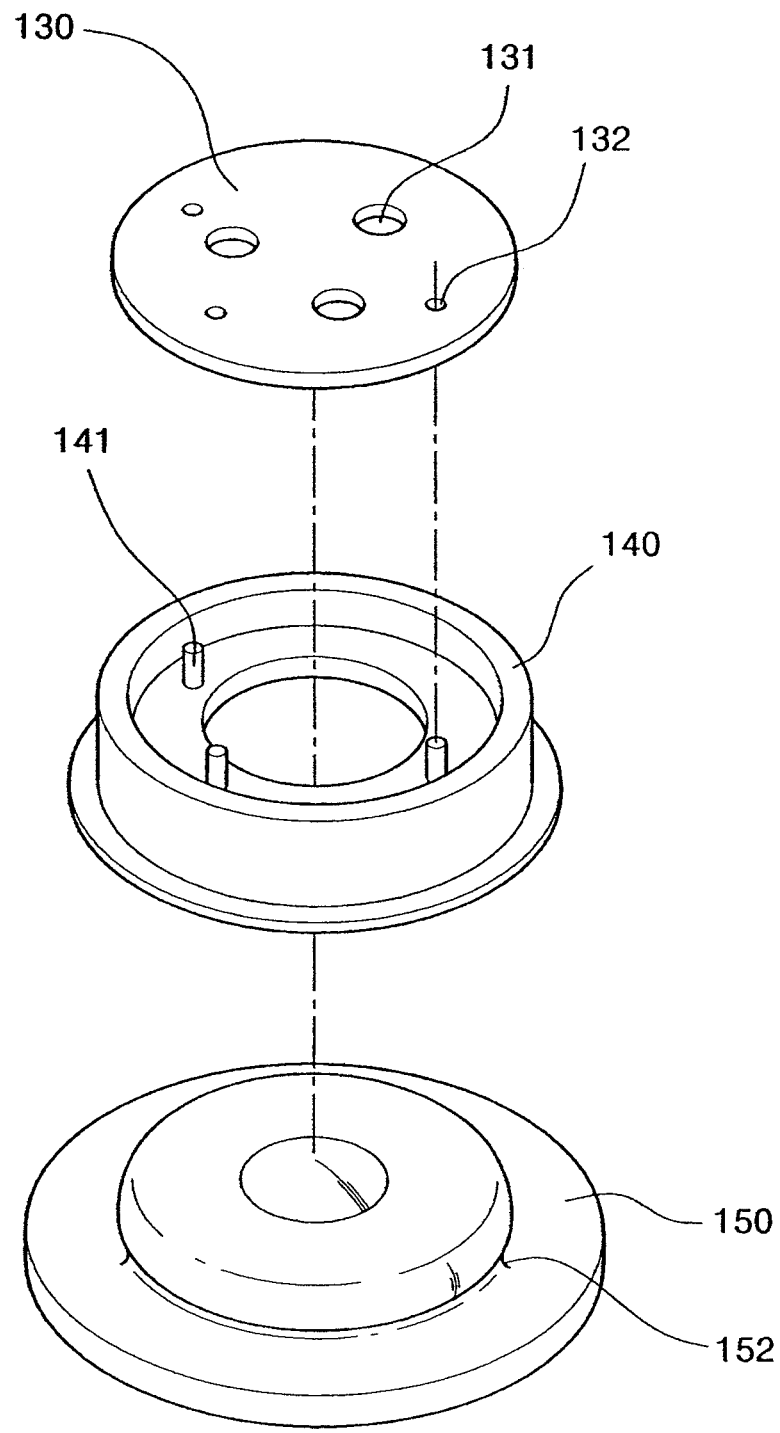
FIG. 1B is an assembly view illustrating a cap assembly of the secondary battery according to the first embodiment of the present invention.

FIG. 1B is an assembly view illustrating a cap assembly of the secondary battery according to the first embodiment of the present invention.

Referring to FIGS. 1A and 1B, a secondary battery according includes an electrode assembly 110 having a cathode plate 111 and an anode plate 112 wound with a separator 113 interposed therebetween. The assembly 110 includes a cathode current collecting plate 115 and an anode current collecting plate (not shown) electrically connected to the electrode assembly 110 for collecting current generated from the cathode plate 111 and the anode plate 112, respectively. The battery also includes a case 120 for accommodating the electrode assembly 110, and a cap assembly 200 coupled with the case 120 for sealing the case 120 and providing electrical connections to the electrode assembly 110.

The electrode assembly 110 includes the cathode plate 111 and the anode plate 112 coated with an active material with the separator 113 interposed therebetween. There are also non-coated portions 111a and 112a of the cathode and anode plates 111 and 112, respectively, which are not coated with the active material.

The cathode current collecting plate 115 and the anode current collecting plate (not shown) are electrically connected to the non-coated portions 111a and 112a of the cathode and anode plates 111 and 112 which are wound to face each other.

The cathode current collecting plate 115 is located between the cap assembly 200 and the electrode assembly 110 for electrically connecting the cathode plate 111 with the cap assembly 200. The anode current collecting plate is located between the case 120 and the electrode assembly 110 for electrically connecting the anode plate 112 with the case 120.

The case 120 is formed of a conductive metal such as aluminum, an aluminum alloy, or nickel plated steel and has a cylindrical shape in which the electrode assembly 110 is placed. The case may be formed in various shapes other than the cylindrical shape.

The cap assembly 200 includes a cap-up or upper cap member 160, a vent plate 150, an insulator 140 and a cap-down or lower cap member 130. The cap assembly 200 is located at an opening of the case 120, with an insulating gasket 170 interposed therebetween.

When the secondary battery is overcharged above a charging condition or a gas is generated in the secondary battery due to a short circuit between the cathode plate 111 and the anode plate 112 of the electrode assembly 110, internal pressure increases and the gas travels through a plurality of ventilation holes 131 of the cap-down 130 and lifts a vent 151 of the vent plate 150.

Accordingly, a weld A between the vent 151 and the cap-down 130 is broken, such that a current path from the electrode assembly 110 to the cap-up 160 via a lead 123 is blocked.

If the internal pressure of the secondary battery further increases, the vent 151 is separated from the vent plate 150 to discharge the gas. Thus, the secondary battery is provided protection against explosion and fire.

Connection of the vent plate 150, the insulator 140 and the cap-down 130 of the cap assembly 200 will now be described in greater detail.

First, the insulator 140 is vertically fastened with the vent plate 150. In this case, a first fastening member 142 of the insulator 140 is coupled with an insertion portion 152 of the vent plate.

Then, the insulator 140 and the cap-down 130 are coupled with each other by engagement between a plurality of protrusions 141 of the insulator 140 and a plurality of holes 132 of the cap-down 130.

The plurality of protrusions 141 correspond to, are inserted into, and are fixed to the plurality of holes 132 in the cap-down 130. In one implementation, a laser may irradiate the protrusions 141 to firmly fix the insulator 140 to the cap-down 130. The protrusions 141 of the insulator are melted by heat generated by the laser and solidified to be firmly coupled with the holes 132.

The Second Embodiment

FIG. 2A is an assembly view illustrating a cap assembly of the secondary battery according to a second embodiment of the present invention.

Figure 2B:
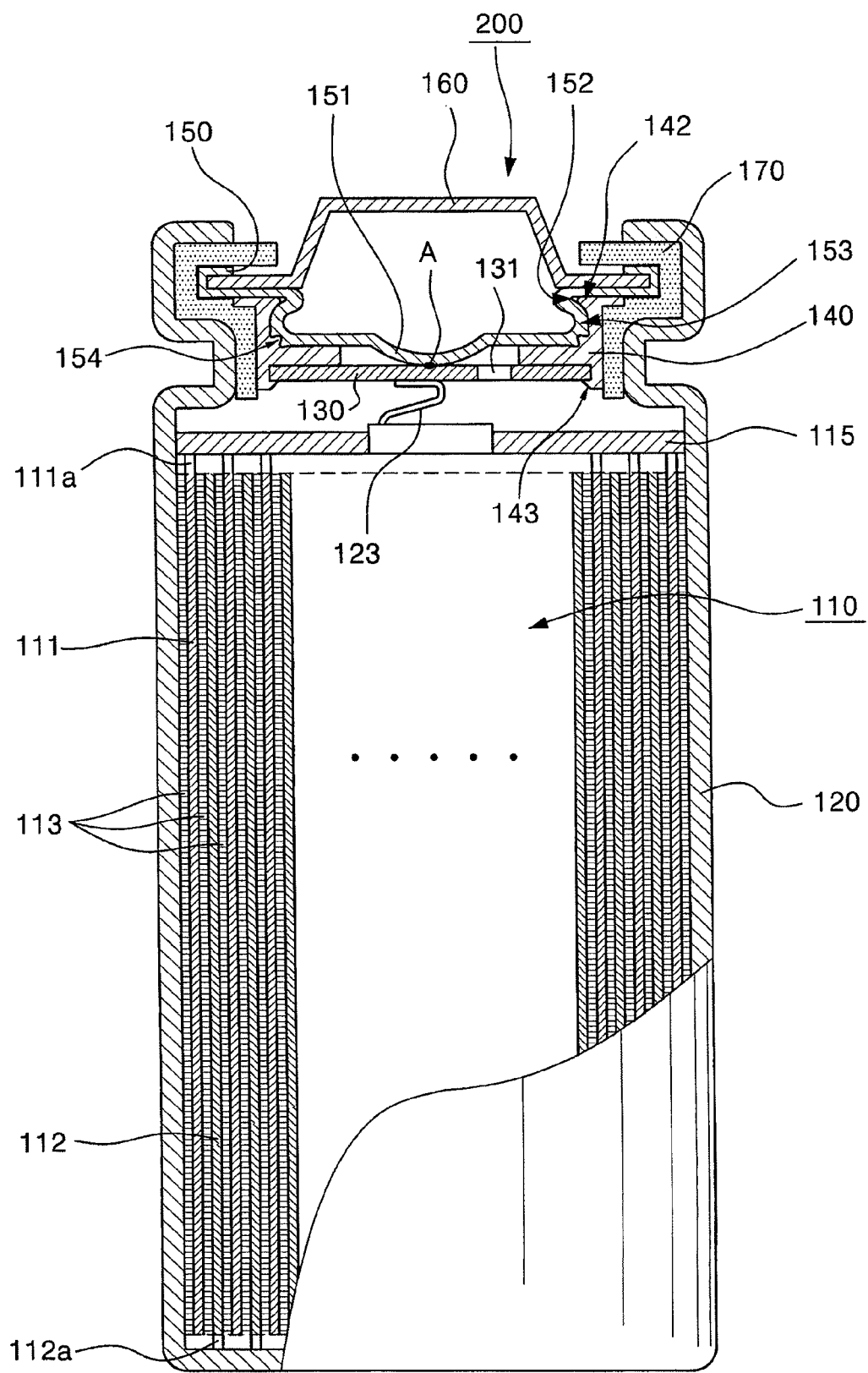
FIG. 2B is a cross-sectional view illustrating a secondary battery according to a second embodiment of the present invention.

FIG. 2B is a cross-sectional view illustrating a secondary battery according to a second embodiment of the present invention;

A secondary battery according to the second embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIGS. 2A and 2B, an insulator 140 is vertically coupled with the vent plate 150. In this case, a first fastening member (not shown) of the insulator 140 is coupled with an insertion portion 152 of the vent plate.

The vent plate 150 comprises a plurality of step areas 154 for increasing a coupling force between the vent plate 150 and the insulator 140.

Figure 11:
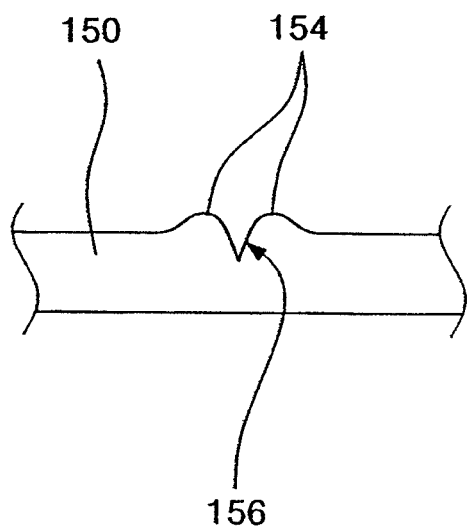
FIG. 11 is an enlarged cross-sectional view illustrating a step area of a vent plate according to the present invention.

The step areas 154 of the vent plate 150 may be apparent from an enlarged view of FIG. 11. Referring to FIG. 11, each step area 154 is formed at an edge of the vent plate 150 and has a groove 156.

Specifically, the step may be formed in a predetermined region around the groove 156 by applying a force to the vent plate 150 to form the groove 156.

The step areas 154 of the vent plate 150 can increase step-induced surface friction upon connection of the vent plate 150 with the insulator 140, thus inhibiting rotation of the insulator 140.

The insulator 140 and the cap-down 130 having ventilation holes 131 are then coupled with each other by the second fastening members 143 of the insulator 140. In this case, the cap-down 130 is vertically pressed by the second fastening members 143.

The Third Embodiment

Figure 3:
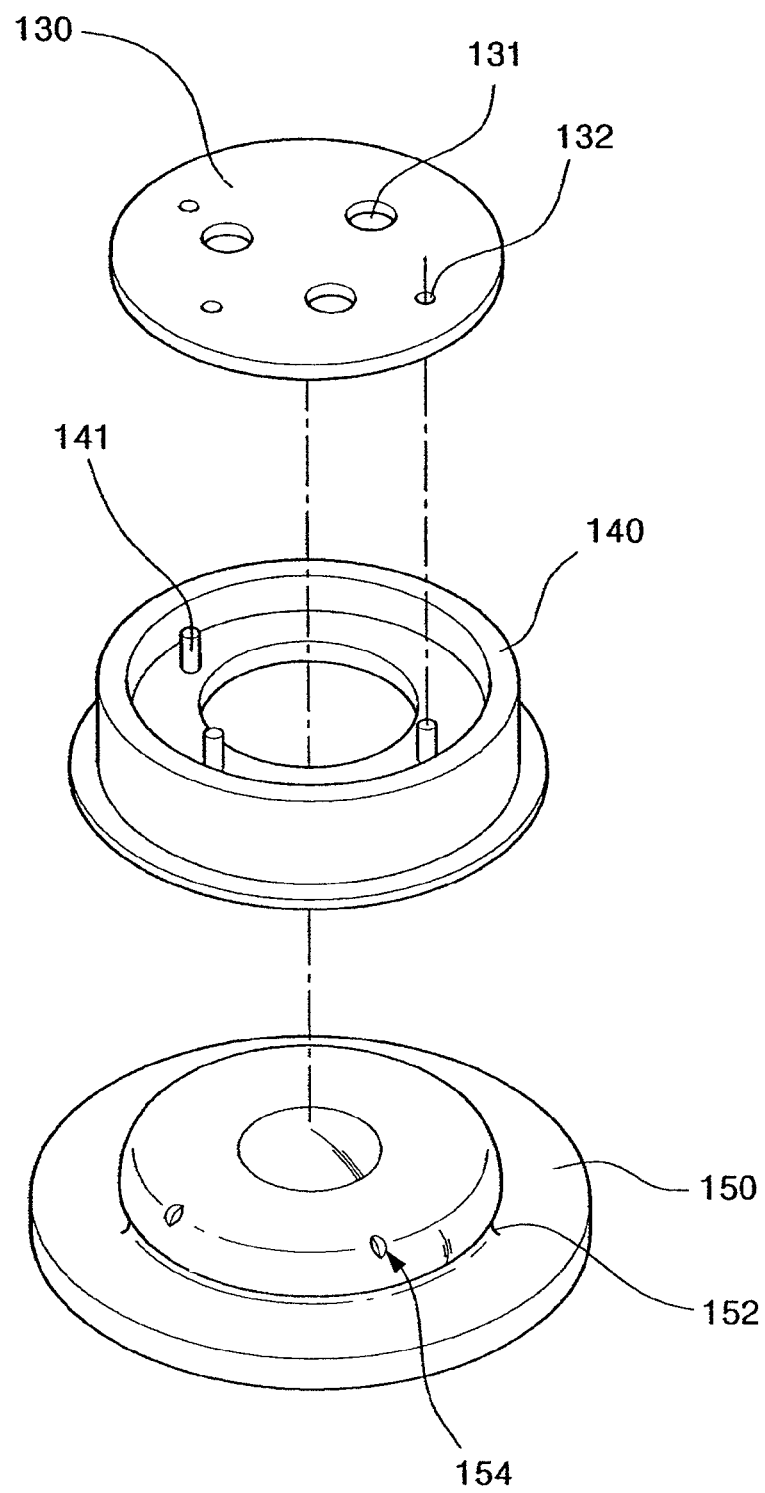
FIG. 3 is an assembly view illustrating a cap assembly of the secondary battery according to a third embodiment of the present invention.

FIG. 3 is an assembly view illustrating a cap assembly of the secondary battery according to a third embodiment of the present invention.

A secondary battery according to the third embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIG. 3, first, an insulator 140 is vertically coupled with a vent plate 150. In this case, a first fastening member (not shown) of the insulator 140 is coupled with an insertion portion 152 of the vent plate in a similar manner as discussed above in conjunction with FIGS. 1A and 2B.

The vent plate 150 comprises a plurality of step areas 154 for increasing a coupling force between the vent plate 150 and the insulator 140.

The step areas 154 of the vent plate 150 may be apparent from the enlarged view of FIG. 11. Referring to FIG. 11, each step area 154 is formed at an edge of the vent plate 150 and has a groove 156.

Specifically, the step may be formed in a predetermined region around the groove 156 by applying a force to the vent plate 150 to form the groove 156.

The step areas 154 of the vent plate 150 can increase step-induced surface friction upon connection of the vent plate 150 with the insulator 140, thus preventing rotation of the insulator 140.

The insulator 140 and the cap-down 130 having ventilation holes 131 are coupled with each other by using a plurality of protrusions 141 of the insulator 140 and a plurality of holes 132 of the cap-down 130.

Thus, the plurality of protrusions 141 correspond to, are inserted into, and are fixed to the plurality of holes 132. In this case, the protrusions 141 are irradiated with a laser so that the insulator 140 is firmly fixed to the cap-down 130.

The protrusions 141 are melted by heat generated by the irradiated laser and solidified to be firmly coupled with the holes 132.

The Fourth Embodiment

Figure 4:
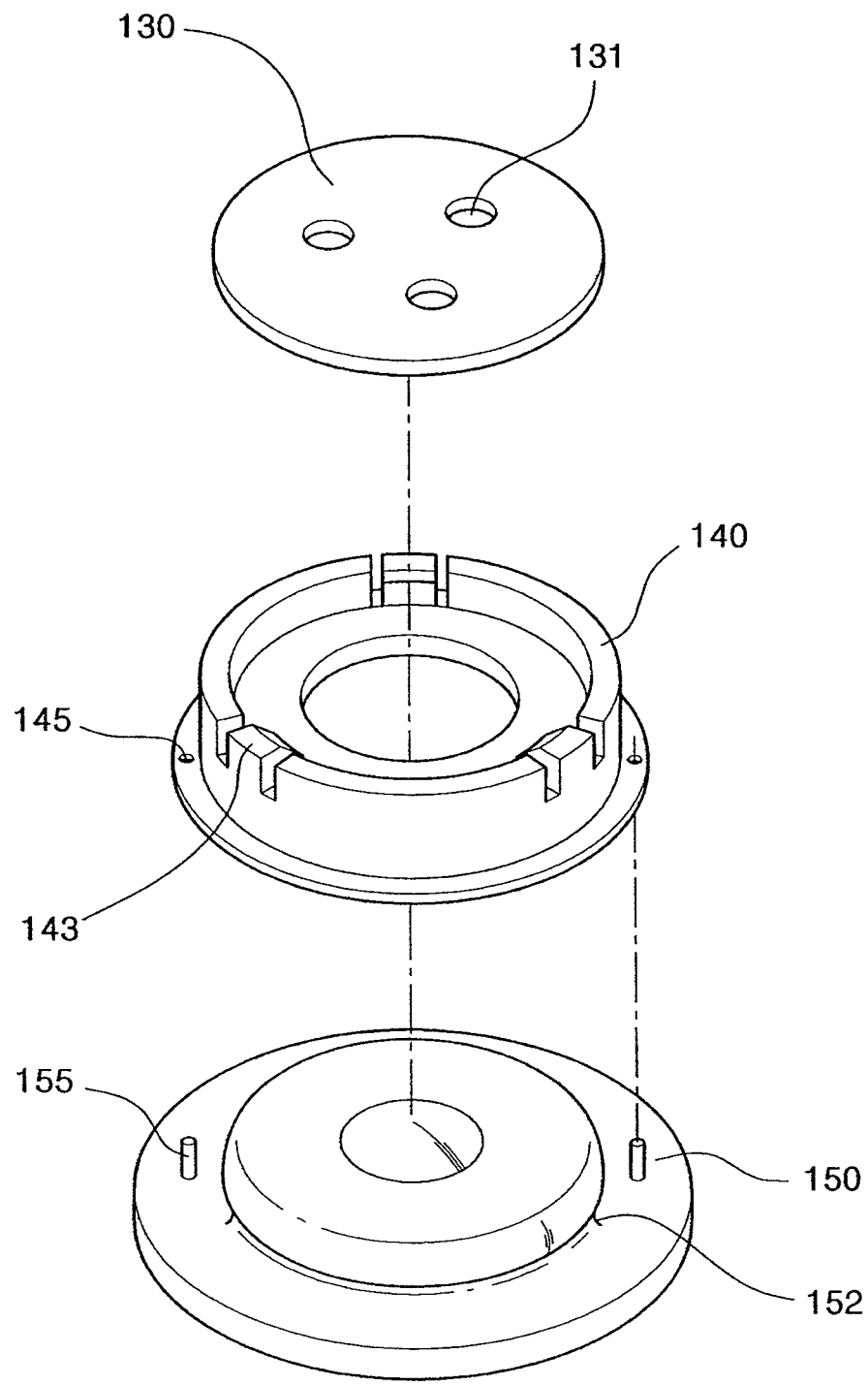
FIG. 4 is an assembly view illustrating a cap assembly of the secondary battery according to a fourth embodiment of the present invention.

FIG. 4 is an assembly view illustrating a cap assembly of the secondary battery according to a fourth embodiment of the present invention.

A secondary battery according to the fourth embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIG. 4, first, an insulator 140 is vertically coupled with a vent plate 150. In this case, a first fastening members (not shown) of the insulator 140 is coupled with an insertion portion 152 of the vent plate in a manner similar to that discussed above in conjunction with FIGS. 1A and 2B.

The vent plate 150 and the insulator 140 are also coupled with each other by a plurality of protrusions 155 of the vent plate 150 and a plurality of holes 145 of the insulator 140.

Thus, the plurality of protrusions 155 correspond to, are inserted into, and are fixed to the plurality of holes 145. In this case, the holes 145 are irradiated with a laser so that the vent plate 150 is firmly fixed to the insulator 140.

The holes 145 of the insulator 140 are melted by heat generated by the laser and solidified to be firmly coupled with the protrusions 155.

Also, the protrusions 155 may be coupled with the holes 145 by applying a physical force to the protrusions 155.

The insulator 140 and the cap-down 130 having ventilation holes 131 are then coupled with each other by using second fastening members 143 of the insulator 140. In this case, the cap-down 130 is vertically pressed by the second fastening members 143.

The Fifth Embodiment

Figure 5:
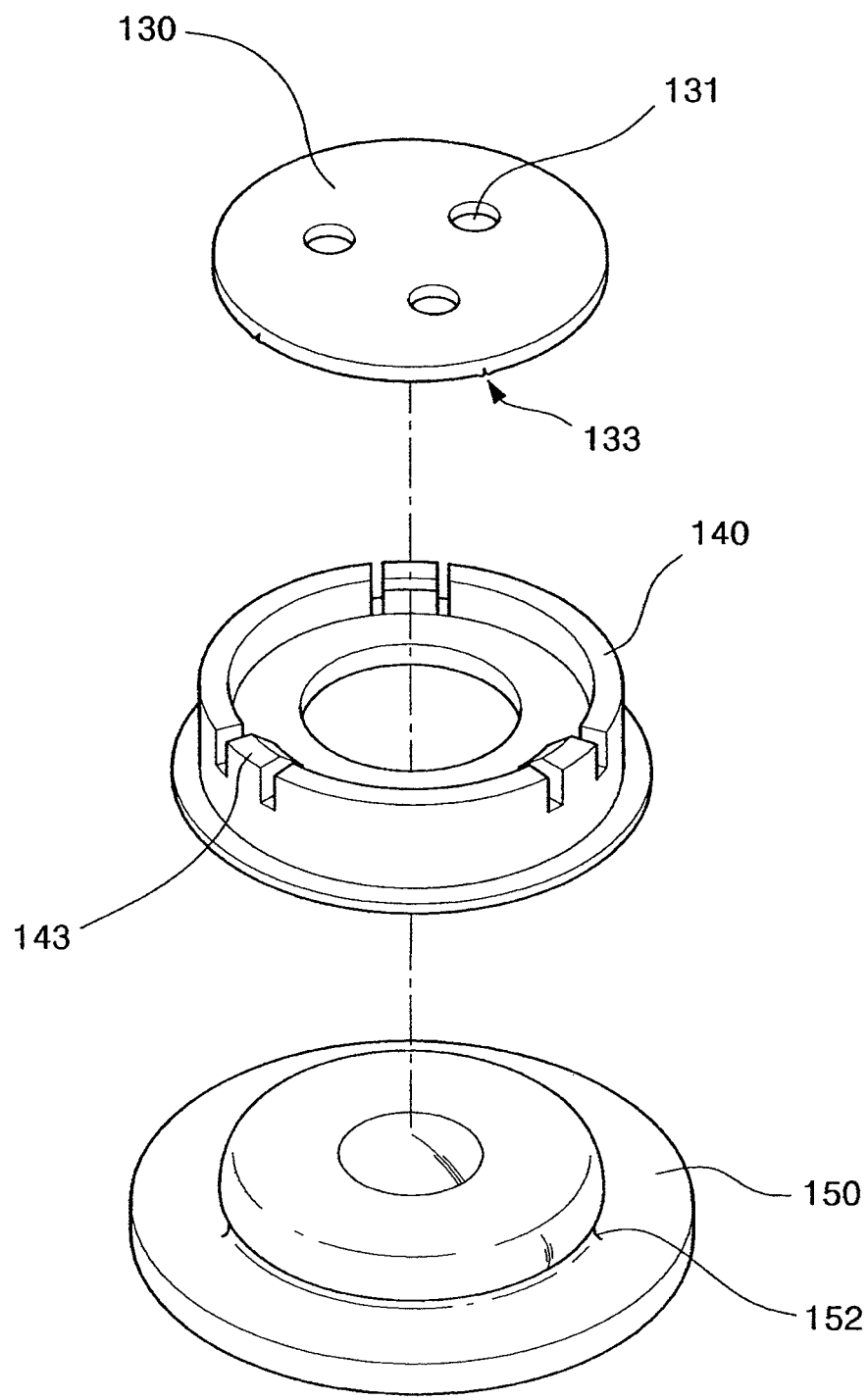
FIG. 5 is an assembly view illustrating a cap assembly of the secondary battery according to a fifth embodiment of the present invention.

FIG. 5 is an assembly view illustrating a cap assembly of the secondary battery according to a fifth embodiment of the present invention.

A secondary battery according to the fifth embodiment of the present invention is the same in structure as the secondary battery according to the first embodiment except for the cap-down, the insulator, and the vent plate of the cap assembly.

Accordingly, aspects of the present embodiment that are the same as in the first exemplary embodiment will not be described again.

Referring to FIG. 5, first, an insulator 140 is vertically coupled with a vent plate 150. In this case, a first fastening member (not shown) of the insulator 140 is coupled with an insertion portion 152 of the vent plate in a manner similar to that discussed above in conjunction with FIGS. 1A and 2B.

The insulator 140 and the cap-down 130 having ventilation holes 131 are then coupled with each other by using second fastening members 143 of the insulator 140. In this case, the cap-down 130 is vertically pressed by the second fastening members 143.

The cap-down 130 comprises a plurality of step areas 133 for increasing a coupling force between the insulator 140 and the cap-down 130.

Figure 12:
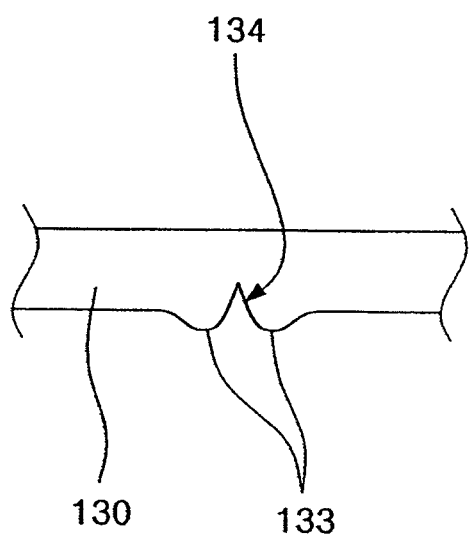
FIG. 12 is an enlarged cross-sectional view illustrating a step area of a cap-down according to the present invention.

The step areas 133 of the cap-down 130 may be apparent from an enlarged view of FIG. 12. Referring to FIG. 12, each step area 133 is formed at an edge of the cap-down 130 and has a groove 134.

Specifically, the step may be formed in a predetermined region around the groove 134 by applying a force to the cap-down 130 to form the groove 134.

The step area 133 of the cap-down 130 can increase step-induced surface friction upon connection of the cap-down 130 with the insulator 140, thus preventing rotation of the cap-down 130.

The Sixth Embodiment

Figure 6:
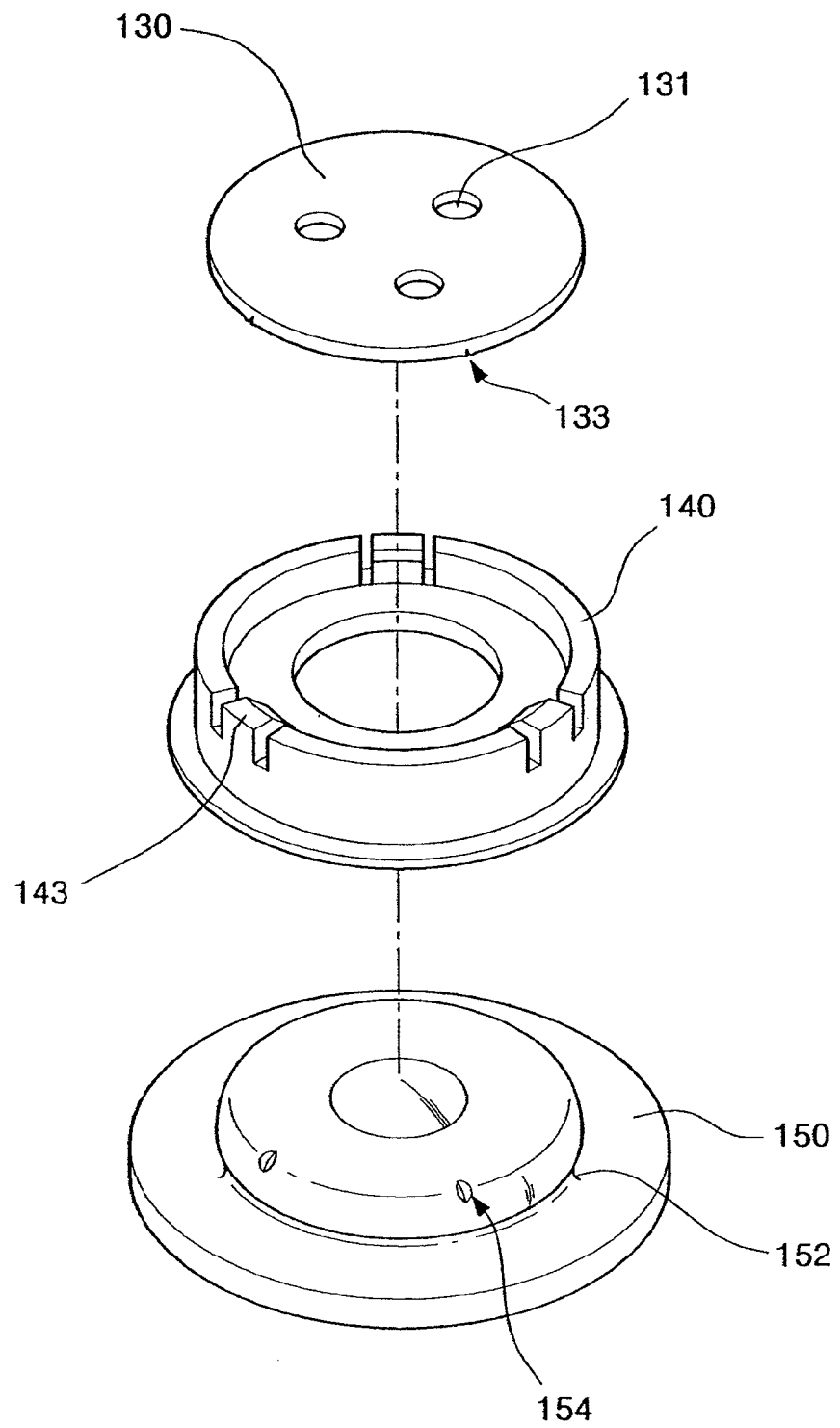
FIG. 6 is an assembly view illustrating a cap assembly of the secondary battery according to a sixth embodiment of the present invention.

FIG. 6 is an assembly view illustrating a cap assembly of the secondary battery according to a sixth embodiment of the present invention.

A secondary battery according to the sixth embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIG. 6, first, an insulator 140 is vertically coupled with a vent plate 150. In this case, a first fastening member (not shown) of the insulator 140 is coupled with an insertion portion 152 of the vent plate in a manner similar to that discussed above in conjunction with FIGS. 1A and 2B.

The vent plate 150 comprises a plurality of step areas 154 for increasing a coupling force between the vent plate 150 and the insulator 140.

The step areas 154 of the vent plate 150 may be apparent from the enlarged view of FIG. 11. Referring to FIG. 11, each step area 154 is formed at an edge of the vent plate 150 and has a groove 156.

Specifically, the step may be formed in a predetermined region around the groove 156 by applying a force to the vent plate 150 to form the groove 156.

Accordingly, the step areas 154 of the vent plate 150 can increase step-induced surface friction upon connection of the vent plate 150 with the insulator 140, thus preventing rotation of the insulator 140.

The insulator 140 and the cap-down 130 having ventilation holes 131 are then coupled with each other by second fastening members 143 of the insulator 140. In this case, the cap-down 130 is vertically pressed by the second fastening members 143.

The cap-down 130 comprises a plurality of step areas 133 for increasing a coupling force between the insulator 140 and the cap-down 130.

The step areas 133 of the cap-down 130 may be apparent from the enlarged view of FIG. 12. Referring to FIG. 12, each step area 133 is formed at an edge of the cap-down 130 and has a groove 134.

Specifically, the step may be formed in a predetermined region around the groove 134 by applying a force to the cap-down 130 to form the groove 134.

The step areas 133 of the cap-down 130 can increase step-induced surface friction upon connection of the cap-down 130 with the insulator 140, thus preventing rotation of the insulator 130.

The Seventh Embodiment

Figure 7:
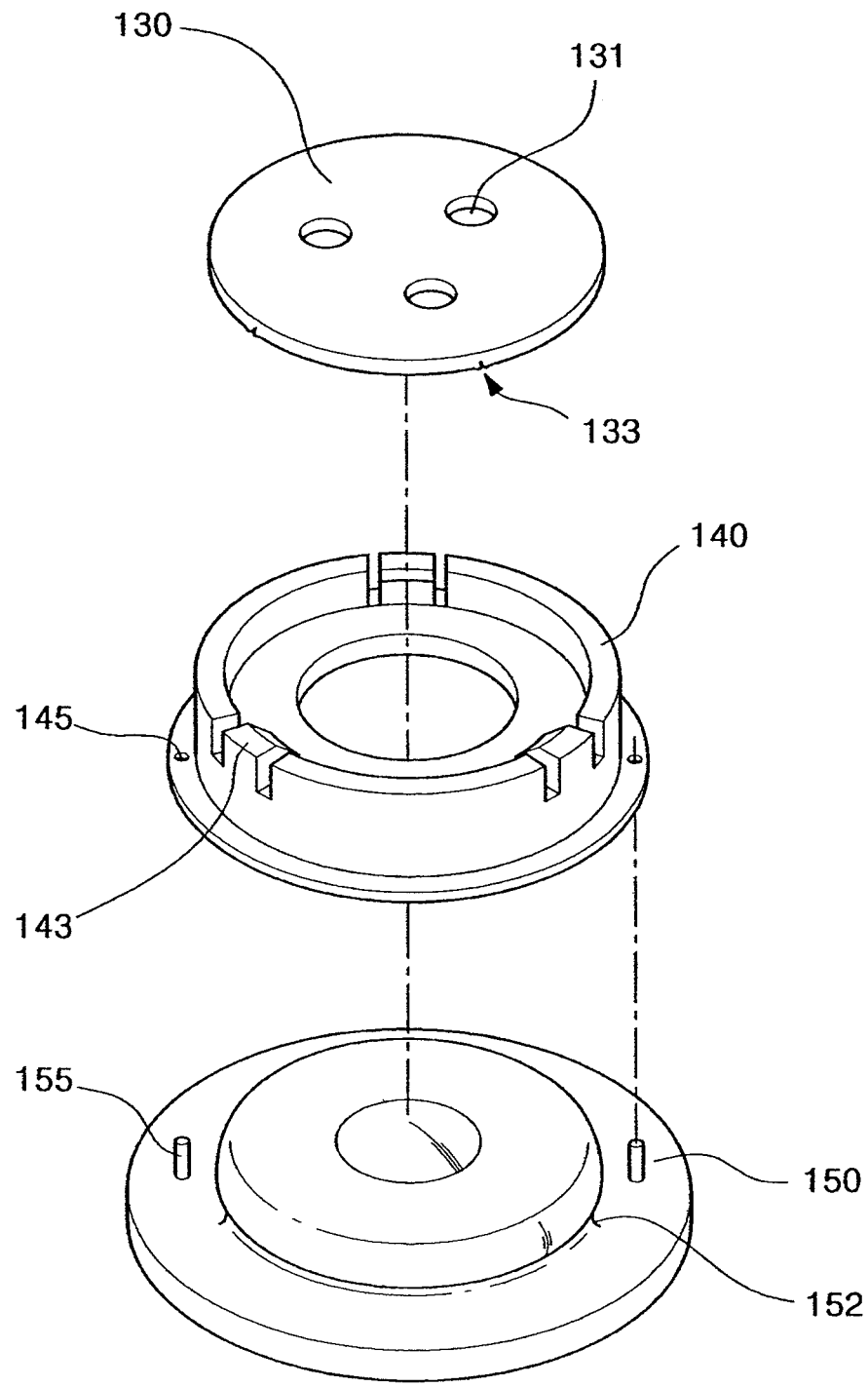
FIG. 7 is an assembly view illustrating a cap assembly of the secondary battery according to a seventh embodiment of the present invention.

FIG. 7 is an assembly view illustrating a cap assembly of the secondary battery according to a seventh embodiment of the present invention.

A secondary battery according to the seventh embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIG. 7, first, an insulator 140 is vertically coupled with a vent plate 150. In this case, a first fastening member (not shown) of the insulator 140 is coupled with an insertion portion 152 of the vent plate in a manner similar to that discussed above in conjunction with FIGS. 1A and 2B.

The vent plate 150 and the insulator 140 are also coupled with each other by a plurality of protrusions 155 of the vent plate 150 and a plurality of holes 145 of the insulator 140.

Thus, the plurality of protrusions 155 correspond to, are inserted into, and are fixed to the plurality of holes 145. In this case, the holes 145 are irradiated with a laser so that the vent plate 150 is firmly fixed to the insulator 140. The holes 145 of the insulator 140 are melted by heat generated by the laser and solidified to be firmly coupled with the protrusions 155. Also, the protrusions 155 may be coupled with the holes 145 by applying a physical force to the protrusions 155.

The insulator 140 and the cap-down 130 having ventilation holes 131 are then coupled with each other by second fastening members 143 of the insulator 140. In this case, the cap-down 130 is vertically pressed by the second fastening members 143.

The cap-down 130 comprises a plurality of step areas 133 for increasing a coupling force between the insulator 140 and the cap-down 130.

The step areas 133 of the cap-down 130 may be apparent from an enlarged view of FIG. 12. Referring to FIG. 12, each step area 133 is formed at an edge of the cap-down 130 and has a groove 134.

Specifically, the step may be formed in a predetermined region around the groove 134 by applying a force to the cap-down 130 to form the groove 134.

The step area 133 of the cap-down 130 can increase step-induced surface friction upon connection of the cap-down 130 with the insulator 140, thus preventing rotation of the cap-down 130.

The Eighth Embodiment

Figure 8:
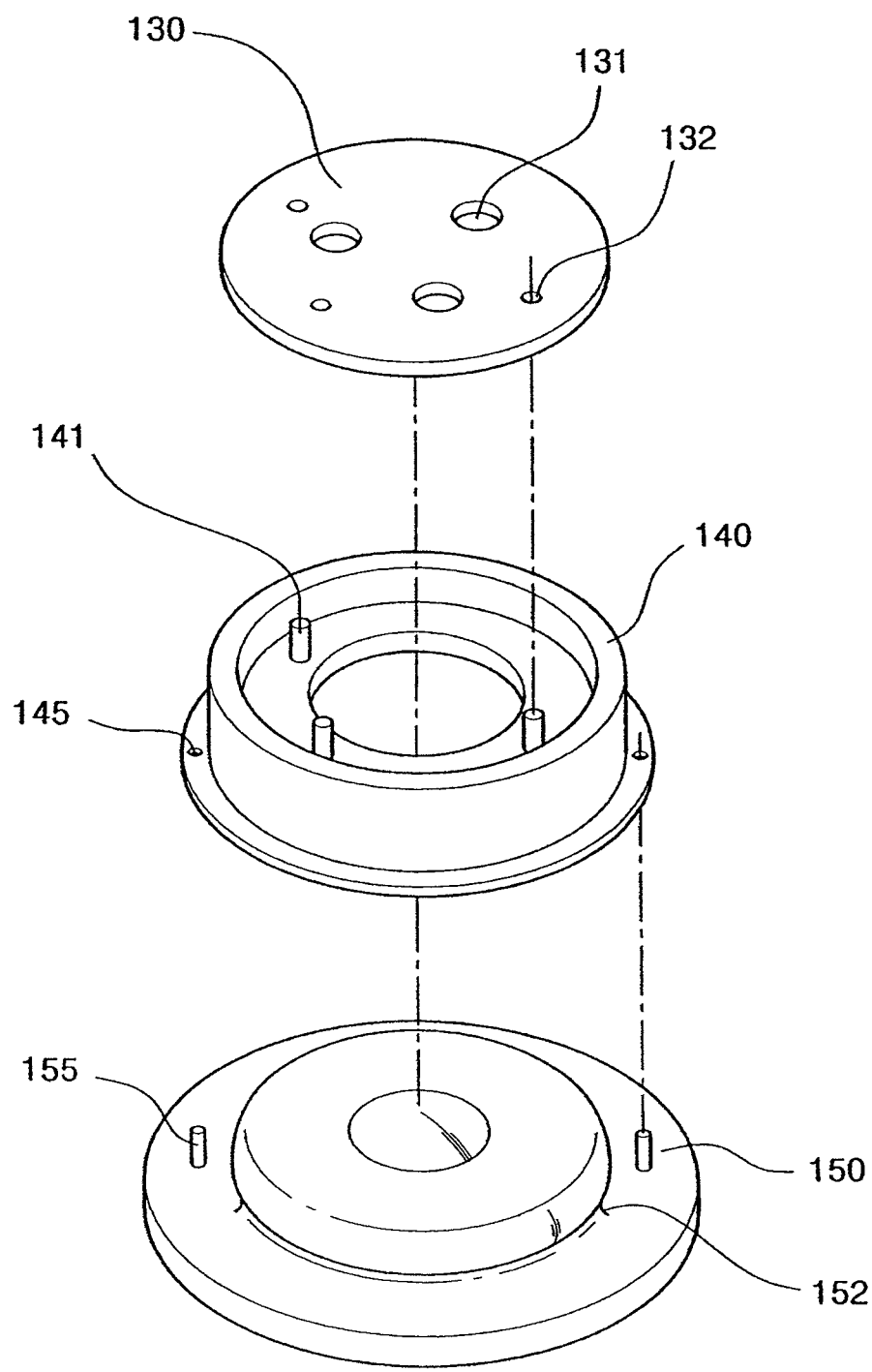
FIG. 8 is an assembly view illustrating a cap assembly of the secondary battery according to an eighth embodiment of the present invention.

FIG. 8 is an assembly view illustrating a cap assembly of the secondary battery according to an eighth embodiment of the present invention.

A secondary battery according to the eighth embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIG. 8, first, an insulator 140 is vertically coupled with a vent plate 150. In this case, a first fastening member (not shown) of the insulator 140 is coupled with an insertion portion 152 of the vent plate in a manner similar to that discussed above in conjunction with FIGS. 1A and 2B.

The vent plate 150 and the insulator 140 are also coupled with each other by a plurality of protrusions 155 of the vent plate 150 and a plurality of holes 145 of the insulator 140.

Thus, the plurality of protrusions 155 correspond to, are inserted into, and are fixed to the plurality of holes 145. In this case, the holes 145 are irradiated with a laser so that the vent plate 150 is firmly fixed to the insulator 140. The holes 145 of the insulator 140 are melted by heat generated by the irradiated laser and solidified to be firmly coupled with the protrusions 155. Also, the protrusions 155 may be coupled with the holes 145 by applying a physical force to the protrusions 155.

The insulator 140 and the cap-down 130 having ventilation holes 131 are then coupled with each other by a plurality of protrusion 141 of the insulator 140 and a plurality of holes 132 of the cap-down 130.

The plurality of protrusions 141 correspond to, are inserted into, and are fixed to the plurality of holes 132. In this case, the laser may be irradiated to the protrusion 141 to firmly fix the insulator 140 to the cap-down 130.

The protrusions 141 of the insulator are melted by heat generated by the laser and solidified to be firmly coupled with the holes 132.

The Ninth Embodiment

Figure 9A:
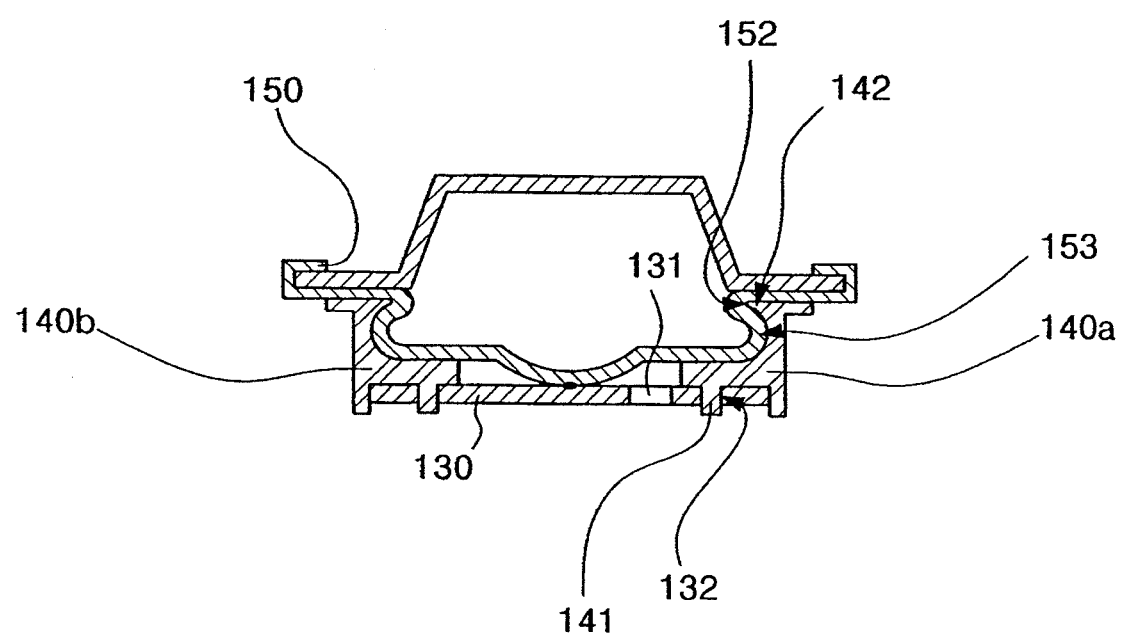
FIG. 9A is a cross-sectional view illustrating a cap assembly of the secondary battery according to a ninth embodiment of the present invention.

FIG. 9A is a cross-sectional view illustrating a cap assembly of the secondary battery according to a ninth embodiment of the present invention.

Figure 9B:
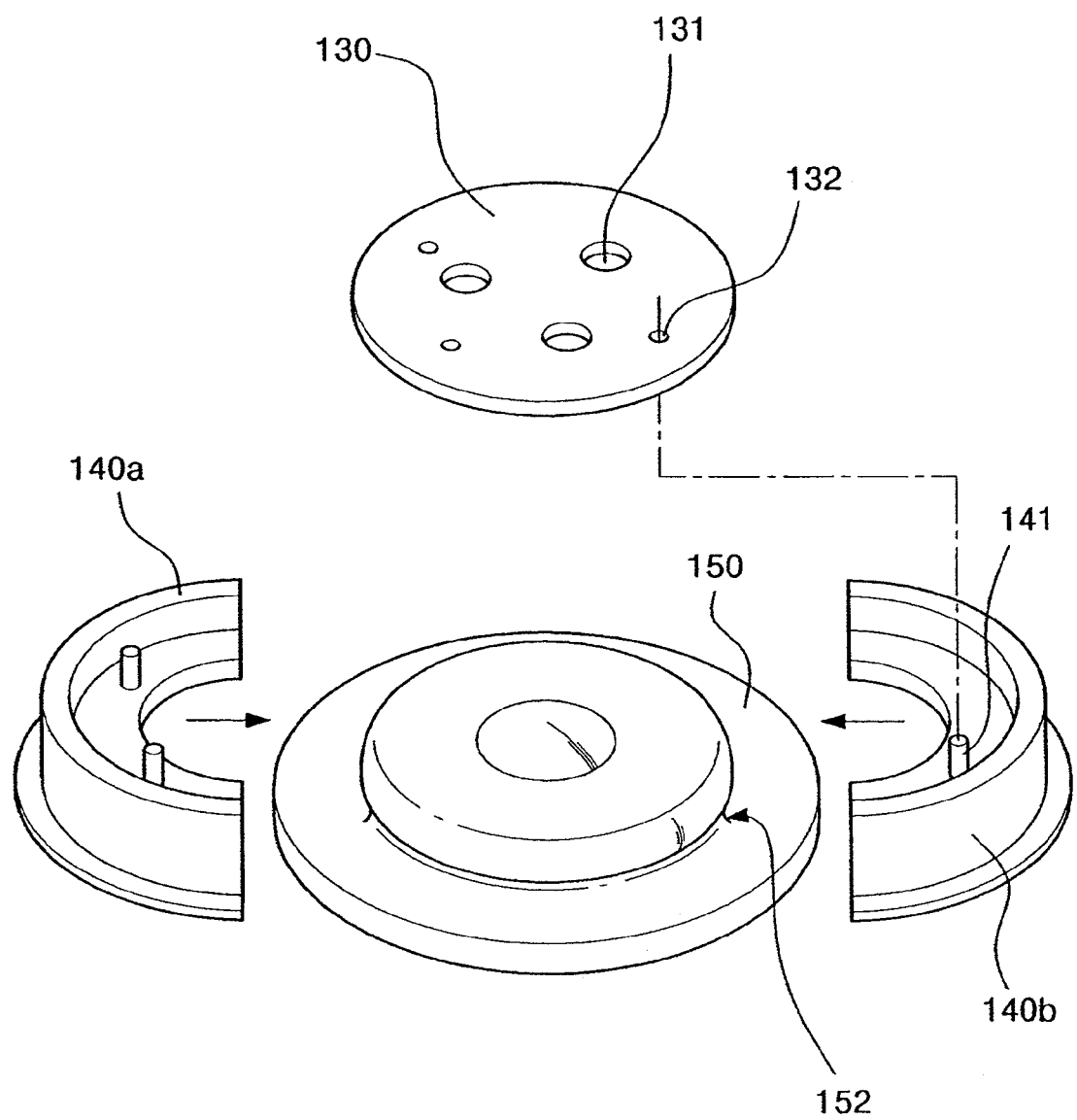
FIG. 9B is an assembly view illustrating a cap assembly of the secondary battery according to the ninth embodiment of the present invention.

FIG. 9B is an assembly view illustrating a cap assembly of the secondary battery according to the ninth embodiment of the present invention.

A secondary battery according to the ninth embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIGS. 9A and 9B, an insulator is divided into two: a first insulator 140a and a second insulator 140b. The first insulator 140a and the second insulator 140b are horizontally inserted into and coupled with an insertion portion 152 of a vent plate.

Horizontally fastening of the divided insulators 140a and 140b with the vent plate 150 can prevent interference between a bent portion 153 of the vent plate and first fastening members 142 of the divided insulators 140a and 140b, which has been conventionally caused by the undivided insulator vertically fastened with the vent plate 150.

Also, the first fastening member 142 of the plurality of divided insulators 140a and 140b is allowed to be formed larger than the first fastening member of the undivided insulator, thus increasing a coupling force between the vent plate 150 and the insulators 140a and 140b.

The insulators 140a and 140b and a cap-down 130 having ventilation holes 131 are then coupled with each other by a plurality of protrusions 141 of the insulators 140a and 140b and a plurality of holes 132 of the cap-down 130.

The plurality of protrusions 141 correspond to, are inserted into, and are fixed to the plurality of holes 132. In this case, a laser may be irradiated to the protrusions 141 to firmly fix the insulators 140a and 140b to the cap-down 130. The protrusions 141 of the insulator are melted by heat generated by the laser and solidified to be firmly coupled with the holes 132.

The Tenth Embodiment

Figure 10A:
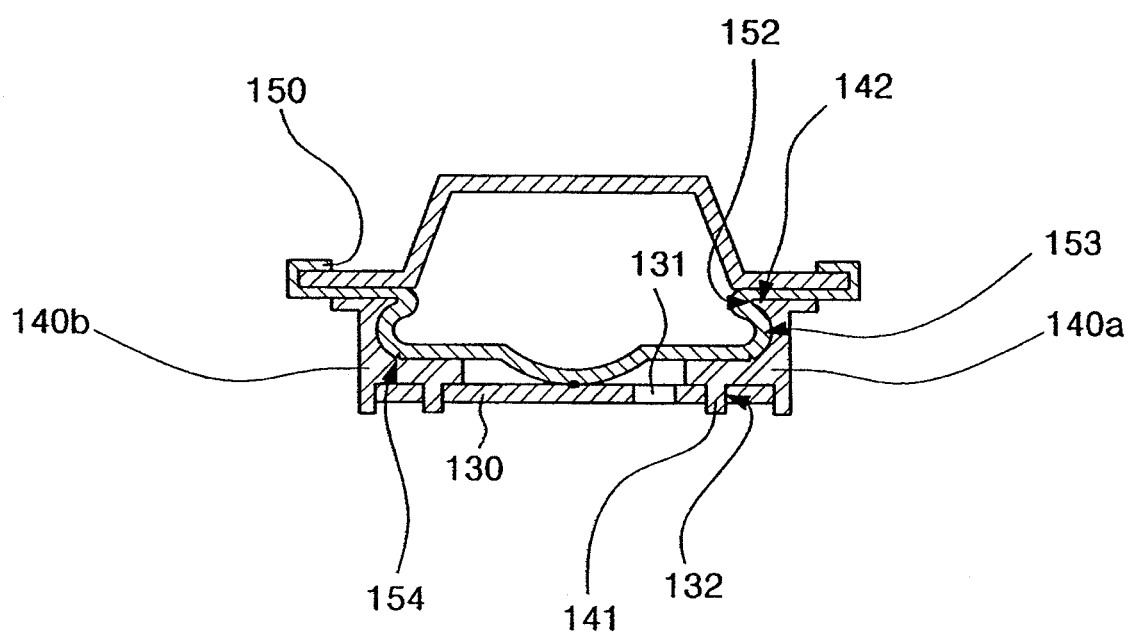
FIG. 10A is a cross-sectional view illustrating a cap assembly of the secondary battery according to a tenth embodiment of the present invention.

FIG. 10A is a cross-sectional view illustrating a cap assembly of the secondary battery according to a tenth embodiment of the present invention.

Figure 10B:
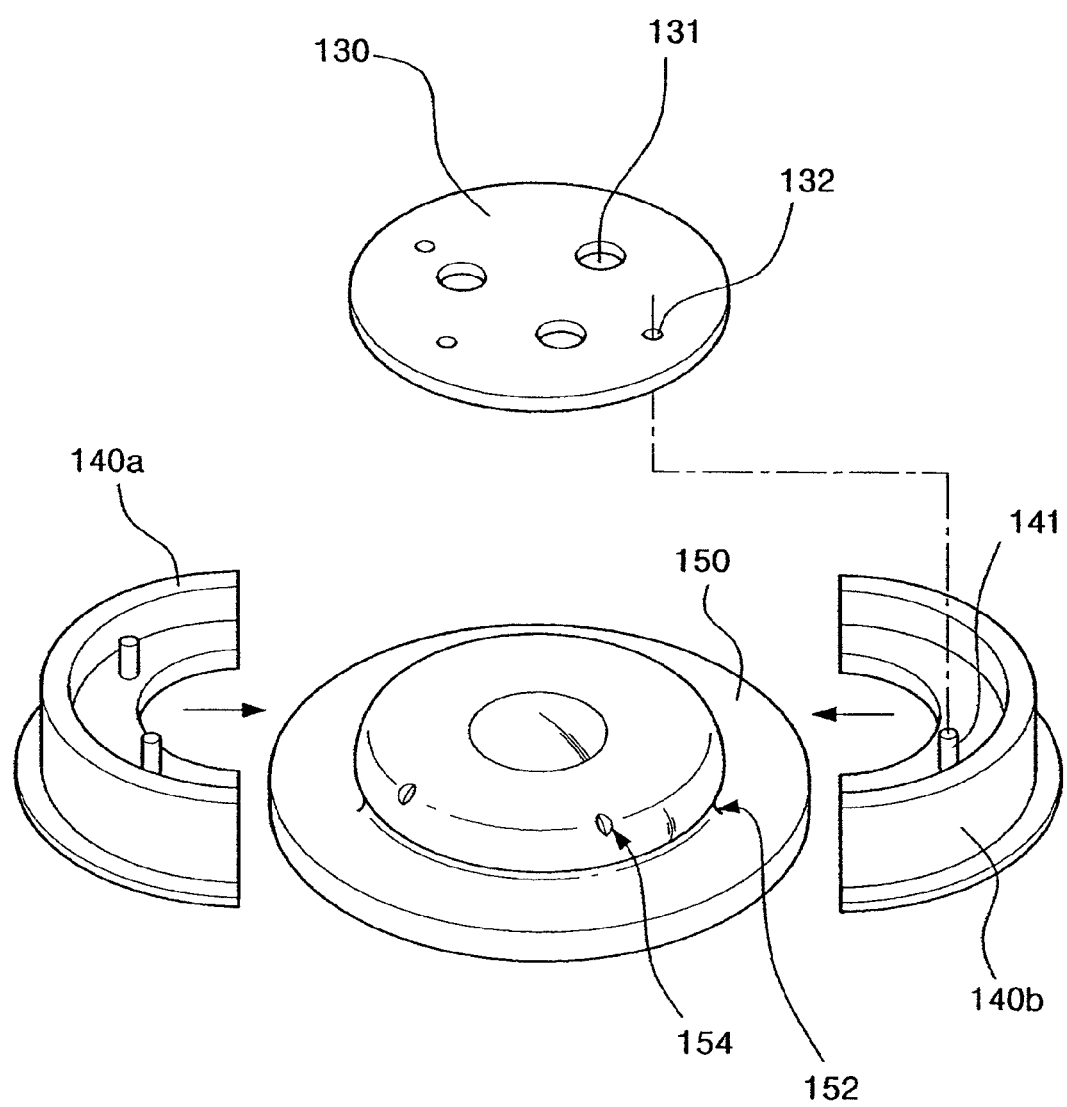
FIG. 10B is an assembly view illustrating a cap assembly of the secondary battery according to the tenth embodiment of the present invention.

FIG. 10B is an assembly view illustrating a cap assembly of the secondary battery according to the tenth embodiment of the present invention.

A secondary battery according to the tenth embodiment of the present invention is the same in structure as the secondary battery according to the first embodiment except for the cap-down, the insulator, and the vent plate of the cap assembly. Accordingly, aspects of the present embodiment that are the same as in the first exemplary embodiment will not be described again.

Referring to FIGS. 10A and 10B, an insulator is divided into two: a first insulator 140a and a second insulator 140b. The first insulator 140a and the second insulator 140b are horizontally inserted into and coupled with an insertion portion 152 of a vent plate.

Horizontally fastening of the divided insulators 140a and 140b with the vent plate 150 can prevent interference between a bent portion 153 of the vent plate and first fastening members 142 of the divided insulators 140a and 140b, which has been conventionally caused by the undivided insulator vertically fastened with the vent plate 150.

Thus, the first fastening member 142 of the plurality of divided insulators 140a and 140b is allowed to be formed larger than the first fastening member of the undivided insulator, thus increasing a coupling force between the vent plate 150 and the insulators 140a and 140b.

The vent plate 150 comprises a plurality of step areas 154 for increasing a coupling force between the vent plate 150 and the insulators 140a and 140b.

The step areas 154 of the vent plate 150 may be apparent from the enlarged view of FIG. 11. Referring to FIG. 11, each step area 154 is formed at an edge of the vent plate 150 and has a groove 156.

Specifically, the step may be formed in a predetermined region around the groove 156 by applying a force to the vent plate 150 to form the groove 156.

The step area 154 of the vent plate 150 can increase step-induced surface friction upon connection of the vent plate 150 with the insulators 140a and 140b, thus preventing rotation of the insulators 140a and 140b.

The insulators 140a and 140b and a cap-down 130 having ventilation holes 131 are then coupled with each other by a plurality of protrusions 141 of the insulators 140a and 140b and a plurality of holes 132 of the cap-down 130.

The plurality of protrusions 141 correspond to, are inserted into, and are fixed to the plurality of holes 132. In this case, the laser may irradiate the protrusion 141 to firmly fix the insulators 140a and 140b to the cap-down 130.

The protrusions 141 of the insulator are melted by heat generated by the laser and solidified to be firmly coupled with the holes 132.

Although the first insulator 140a and the second insulator 140b in a divided form have been described by way of example in the ninth and tenth embodiments, a plurality of insulators may be included.

The first to tenth embodiments of the present invention have been described with respect to the plurality of holes 132 and 145 corresponding to and coupled with the plurality of protrusions 141 and 155 with reference to the drawings. However, the holes 132 and 145 are not limited thereto but may be any sort of indentation, such as holes, grooves, etc. without departing from the present teachings.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A secondary battery comprising:
   an electrode assembly formed with a separator interposed between a cathode plate and an anode plate;
   a case for accommodating the electrode assembly;
   a cap assembly for sealing the case; and
   an insulating gasket disposed between the case and the cap assembly,
   wherein the cap assembly comprises a vent plate having a curved vent, an insulator including one or a plurality of protrusions, and a cap-down including one or a plurality of holes located corresponding to the protrusions so that the protrusions extend through the holes, and
   wherein the insulator is interposed between the vent plate and the cap down and between the cap down and the insulating gasket, and the cap down is interposed between the electrode assembly and the vent plate.

2. The secondary battery according to claim 1, wherein the protrusions are coupled with the holes by heating.

3. The secondary battery according to claim 1, wherein the cap assembly comprises a plurality of insulators each including a plurality of protrusions.

4. A secondary battery comprising:
   an electrode assembly formed with a separator interposed between a cathode plate and an anode plate;
   a case for accommodating the electrode assembly;
   a cap assembly for sealing the case, the cap assembly comprising a vent plate having a curved vent, an insulator and a cap-down wherein the insulator includes one or a plurality of protrusions, and the cap-down includes one or a plurality of holes located corresponding to the protrusions so that the protrusions extend through the holes, and
   an insulating gasket disposed between the case and the cap assembly,
   wherein the insulator is interposed between the vent plate and the cap down and between the cap down and the insulating gasket, and the cap down is interposed between the electrode assembly and the vent plate
   wherein the vent plate or the cap-down has one or a plurality of step areas that receives a portion of the insulator.

5. The secondary battery according to claim 4, wherein the insulator comprises one or a plurality of protrusions, and the cap-down comprises one or a plurality of holes located corresponding to the protrusions.

6. The secondary battery according to claim 5, wherein the protrusions correspond to and are inserted into the holes.

7. The secondary battery according to claim 5, wherein the protrusions are coupled with the holes by heating.

8. The secondary battery according to claim 5, wherein the cap assembly comprises one or a plurality of insulators each including a plurality of protrusions.

9. The secondary battery according to claim 4, wherein the vent plate and the cap-down including one or a plurality of step areas.

* * * * *